Feb. 12, 1924.
E. M. GOODWIN
1,483,579
ELECTRICAL AMUSEMENT DEVICE
Filed May 29, 1922
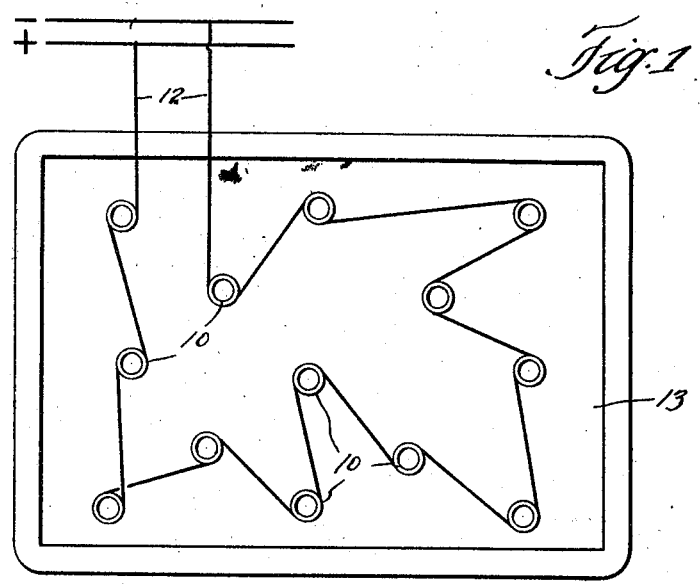
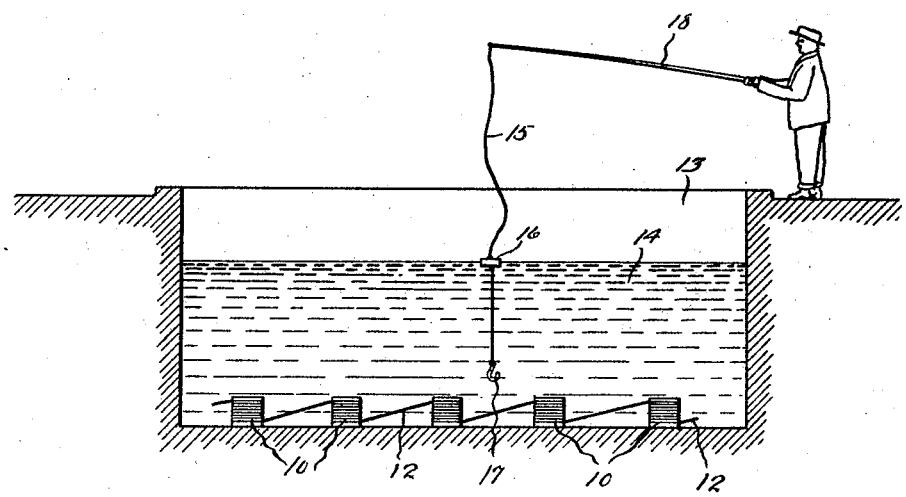
Inventor
E. M. Goodwin Patented Feb. 12, 1924.

1,483,579

UNITED STATES PATENT OFFICE.

EMERY M. GOODWIN, OF CLEVELAND, OHIO.

ELECTRICAL AMUSEMENT DEVICE.

Application filed May 29, 1922. Serial No. 564,383.

*To all whom it may concern:*

Be it known that I, EMERY M. GOODWIN, a citizen of the United States, residing at Cleveland, in the county of Cuyahoga and State of Ohio, have invented a certain new and useful Improvement in Electrical Amusement Devices, of which the following is a full, clear, and exact description, reference being had to the accompanying drawings.

This invention relates generally to amusement devices or puzzles and more particularly to one which is intended to simulate the sport or amusement of fishing.

The object of the invention is to provide a device of this general character which can be employed at amusement parks, fairs and the like and if desired the apparatus can be constructed for indoor use.

Another object of the invention is to provide a simple and efficient electric device which in connection with a certain type of fishing hook line and rod will simulate the biting of the fish or taking of the bait.

The invention consists primarily in the employment of one or more electro-magnetic coils which are submerged and concealed from view and a fishing line embodying a float and a member at the end of said line capable of being attracted by the electric coils when placed in the vicinity thereof, thereby pulling down the float or cork and giving the appearance of the biting of a fish.

The invention consists also in certain details of construction hereinafter fully described and pointed out in the claims.

The invention is particularly adapted for amusement parks along the seashore or lake front where water is convenient but it can also be employed at other places and if desired can be arranged for inside use if so desired.

In the drawing I have indicated diagrammatically the general nature and operation of my invention and in which Fig. 1 is a plan view of the invention and Fig. 2 is a sectional view partly in elevation.

In the practical embodiment of my invention I employ one or more electric coils 10 connected with any suitable source of electricity 11 by means of the conductor wires 12 and where a plurality of coils 10 are employed as is usually the case these coils are connected in series as most clearly shown. These coils 10 are submerged as most clearly shown in Fig. 2 being arranged upon the bottom of any suitable enclosure 13 containing water 14 of a suitable depth and in connection with the electric coils thus arranged I employ a line 15 having the float 16 connected thereto and a metallic member 17 at the lower end thereof, said member being preferably in the form of a hook and of such material that when placed in the vicinity of one of the coils will be attracted to said coil when the circuit is closed after the manner of a core being drawn into a solenoid, the electric coils 10 being in fact solenoids and the member 17 being the core thereof and in practice I prefer to employ a rod 18 by means of which the line and float can be directed or moved about so as to bring the hook over one of the coils so as to have the same attracted, the attraction serving to submerge the float or cork 16 thereby simulating the appearance of the fish having bitten. If desired, a number of contestants can be fishing in the pool or body of water at the same time and the one obtaining the largest number of bites within a given space of time can be considered as having won the game, or at amusement parks a contestant can have so many throws or casts for a definite sum of money and by getting a definite number of bites within a specified time may win a prize.

There are various ways and methods in which the apparatus can be utilized to provide amusement, all of which will be apparent to the person having the control or management of the same.

Having thus described my invention, what I claim is:

A device of the kind described comprising an electric circuit and a plurality of submerged coils, a rod, and a line depending from said rod, a metallic member attached to the lower end of said rod and adapted to be submerged, and a float connected to said line and adapted to maintain the metallic member at a definite depth, the rod and line serving to direct the metallic member into alignment with one of the coils so that said member may be attracted and the float submerged.

In testimony whereof, I hereunto affix my signature.

EMERY M. GOODWIN.